UNITED STATES PATENT OFFICE.

ORRA E. BYRON, OF DETROIT, MICHIGAN, ASSIGNOR TO STEPHEN A. GRIGGS, OF WALKERVILLE, ONTARIO, CANADA.

TRAILER.

1,284,588.  Specification of Letters Patent.  Patented Nov. 12, 1918.

Application filed January 18, 1917. Serial No. 142,980.

*To all whom it may concern:*

Be it known that I, ORRA E. BYRON, a citizen of the United States, residing at Detroit, county of Wayne, State of Michigan, have invented a certain new and useful Improvement in Trailers, and declare the following to be a full, clear, and exact description of the same, such as will enable others skilled in the art to which it pertains to make and use the same, reference being had to the accompanying drawings, which form a part of this specification.

This invention relates to a trailer and more especially to the steering and draft gear for the same. It is intended as an improvement on my prior Patent #1,201,800 October 17, 1916.

In my prior patent an arrangement of draft bar and tongue is shown in which the steering wheels can be locked in non-swiveling position as may also the draft bar and the tongue may be allowed to swivel with respect to the draft bar, or on the other hand, the tongue and draft bar may be locked together and the wheels allowed to swivel in accordance with the movements of the combined draft bar and tongue. It is to provide an improved means to effect these results and a draft rigging and steering gear connected directly with the frame that the present invention is designed.

Provision is made to accommodate the steering gear to the relative movement permitted between the frame and axle by the spring suspension.

In the drawings:

Fig. 4 is a detail of the rear link of the compound steering link.

Fig. 5 is a detail of one of the radius rods.

Fig. 6 is a detail of the front link of the compound steering link.

Fig. 7 is a plan view of the draft bar.

Fig. 8 is a side elevation of the draft bar.

$a$ designates the frame of the trailer, $b$ the axle, $c$ the semi-elliptical spring connecting the axle and the frame. The draft rigging comprises a coupling head $d$ having a rearward extension which pivots by the bolt $e$ to the draw bar $f$. The lower end of this bolt $e$ enlarges and forms a ball-like head $g$ that engages in the slotted and bored end $h$ of the compound steering link (detail Fig. 6). The rear end of the front link $i$ is provided with a hub $j$ adapted to engage in the throat of the yoke $k$, a pin $l$ with suitable cotters pivoting the front link $i$ to this yoke-like head of the rear link $m$. This compound draw link $m$ $i$ is connected with the steering arm $n$ by means of the drag link $o$. By reason of the hinging connection between the front draw link $i$ and the rear draw link $m$ it is evident that the compound draw link may accommodate itself to the different relative positions of the frame and the axle due to the spring suspension; especially is this so as the slotted and bored end $h$ of the front draw link $i$ has the loose connection with the bolt $e$.

It will be noted that the rear link $m$ is a casting which not only contains the yoke head but contains a sleeve-like portion $p$ through which a pin 5 is secured in place by suitable cotters and may pivot the compound draw link to the axle. It will be noted that the rear end of the draw bar $f$ is pivoted to the cross channel $q$ of the frame $a$ by means of the pin $r$.

Figure 9:
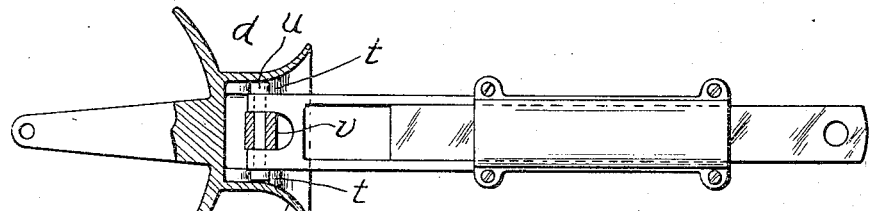
Fig. 9 is a top view of the coupling head and the draw bar of the preceding vehicle, the coupling head being sectioned.
Figure 10:
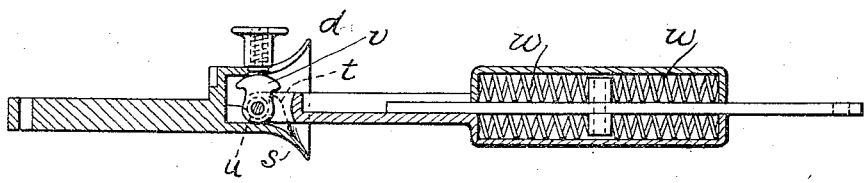
Fig. 10 is a longitudinal vertical section of the same members.

Now referring to Figs. 9 and 10, the coupling head comprises a casting with the usual bell-like head $s$ on the inside and on the bottom of which are a pair of shoulders $t$ $t$. The rear end of the draw bar of the preceding vehicle is provided with a projecting cross pin $u$ whose ends can be dropped behind the shoulders $t$, the dog $v$ may then be turned up which prevents the ends of the cross pin $u$ from rising above the shoulders. It will be noted that the draw bar of the preceding vehicle is a two-part one in which the two parts have relative longitudinal movement resisted by suitable buffer springs $w$ which need only here be referred to generally.

Figure 1:
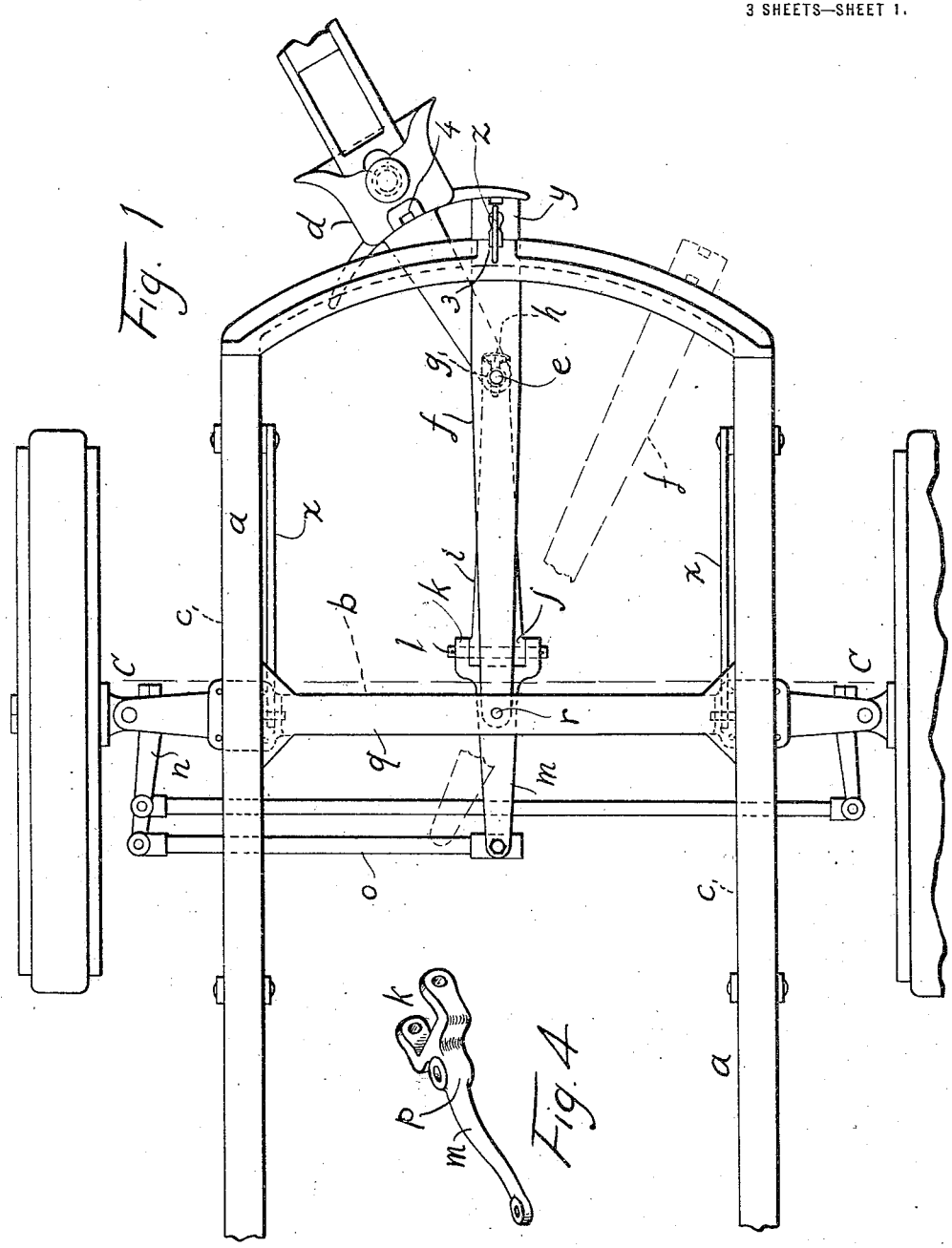
Figure 1 is a plan view.
Figure 2:
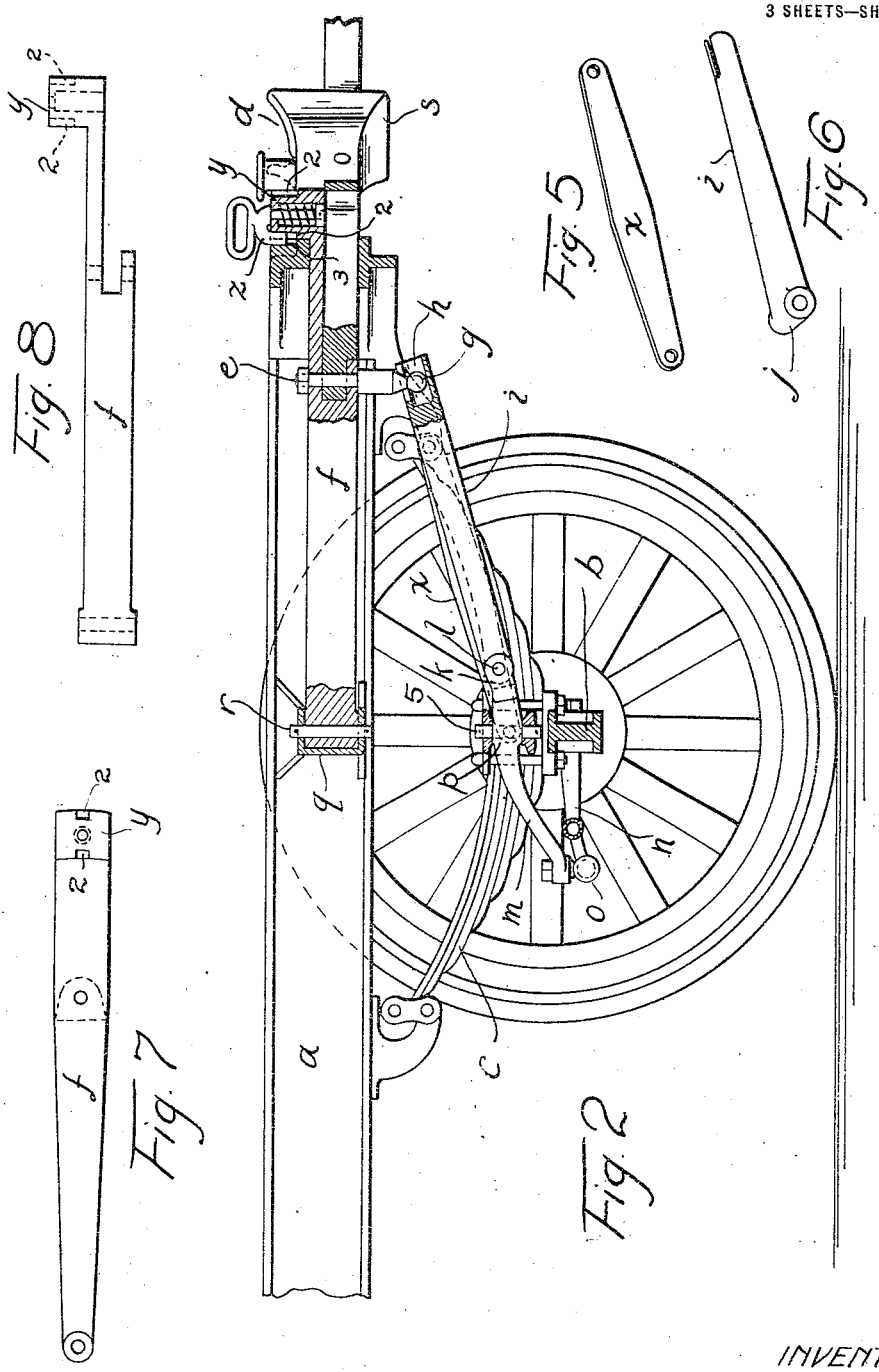
Fig. 2 is a longitudinal section of one end of the trailer.
Figure 3:
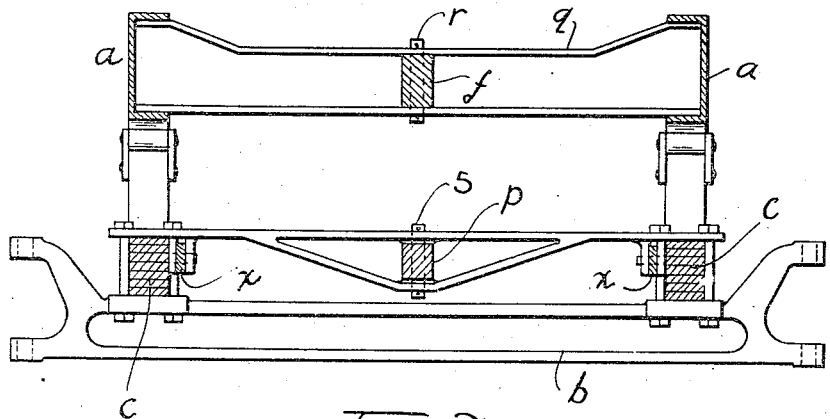
Fig. 3 is a cross section on the line C—C Fig. 1.

The axle $b$ and the frame are connected by radius rods $x$ whose purpose is the usual one of serving to communicate the pull of the frame to the wheel of the car without utilizing the spring. The draw bar $f$ is provided with an upwardly projecting nub $y$ socketing the spring retained and hook-like latch $z$. Recesses 2 are provided forward and aft on the nub, each adapted to pair with a similar recess 3 on the frame and a similar recess 4 on the coupling head. Obviously the latch 2 may have its hook engaging in the pair of recesses 2, 3 (Fig. 2) keying the draft bar and frame together and allowing the coupling head to swivel, or the latch may have its hook engaging with the pair of recesses 2, 4 keying the coupling head and draft bar *f* together to allow them to swivel as a unit in the frame. Hence the wheels of the trailer may be allowed to swivel for steering purposes or may be locked in non-swiveling position.

What I claim is:

1. In a vehicle, the combination of an axle, a frame, a spring for supporting the frame upon the axle, a compound steering lever having two parts, one of which is pivoted to the axle swiveled together to allow for the relative movement of the frame and axle, a draw and steering bar having a loose connection with the steering lever and mounted upon the frame.

2. In a vehicle, the combination of an axle, a frame, a spring for connecting the axle and the frame, draft rigging comprising a draw bar pivoted to the frame, wheels swiveled to the axle, a steering lever pivotally supported upon the axle and connected with the draw bar and with the steering wheels and arranged to allow for the relative movement of the axle and frame.

3. In a vehicle, the combination of a frame, an axle, a spring for supporting the frame upon the axle, steering wheels swiveled to the axle and draft rigging comprising a draw bar pivoted to the frame, a compound two part steering lever pivotally supported on the axle loosely connected to the draft bar and connected with the steering wheels.

4. In a vehicle, the combination of a frame, an axle, a spring for supporting the frame upon the axle, draft rigging comprising a draw bar pivoted at its rear end to the frame, a steering lever comprising a front and a rear link hinged together, the rear link being pivotally supported on the axle, steering wheels swiveled to the axle and connected to the rear link and a loose connection between the draft bar and front of the front link.

5. In a vehicle, the combination of a frame, an axle, steering wheels, a spring for supporting the frame upon the axle, a draft and steering bar mounted on the frame, a two-part steering lever connected with the steering bar and having its two parts hinged together and having at its rear end a connection with the steering wheels, one of the parts of said steering lever being pivoted to the axle, and one or more radius rods between the axle and the frame.

6. In a vehicle, the combination of a frame, an axle, a spring suspension for the frame upon the axle, a two-part steering link comprising a front lever having a hub, a rear link having a yoke and vertical sleeve, the yoke serving to pivot the rear end of the front link through the hub and allow a vertical hinging action and the vertical sleeve serving to allow pivoting of the rear link to the axle.

7. In a vehicle, the combination of a frame, an axle, a spring suspension for the frame upon the axle, and draft rigging in the form of a draw bar, means for locking the draw bar to the frame or for allowing it to swivel with respect to the frame, a coupling head which can swivel with respect to the draw bar or be locked thereto, a compound steering lever which breaks vertically and has its rear link portion pivoted to the axle, steering wheels swiveled to the axle and connected to the rear link portion and a loose connection between the front link and the draft rod and coupling head.

8. In a vehicle, the combination of an axle, a frame, a draft and steering bar pivoted at its rear to the frame and having a hub with a pair or recesses, said vehicle frame having a recess at the front, a coupling head pivoted to the draft bar and also having a recess and a latch provided with a portion which may be disposed in one pair of recesses to lock the draft bar to the frame and in the other set of recesses to lock the draft bar to the coupling head.

9. In a vehicle, the combination of an axle, a frame, a draft and steering bar, a coupling head pivoted thereto and a single swiveled latch device for optionally locking the draft bar to the vehicle frame and allowing the coupling head to swivel with respect to the draft bar or on the other hand for locking the draft bar and coupling head together and allowing the two to swivel with respect to the vehicle frame.

10. In a vehicle, the combination of an axle, swiveled wheels upon the ends thereof, a frame, a draw bar pivotally connected to the frame, springs mounted on the axle to support the frame and allow vertical movements between the axle and the frame and draw bar, a steering lever pivotally mounted on the axle, a link connection between said lever and said wheels, and a self adjusting connection between the draw bar and the steering lever permitting vertical movement of the draw bar relative to the steering lever but causing the lever to turn laterally with the draw bar.

In testimony whereof, I sign this specification.

ORRA E. BYRON.